Figure 1C:
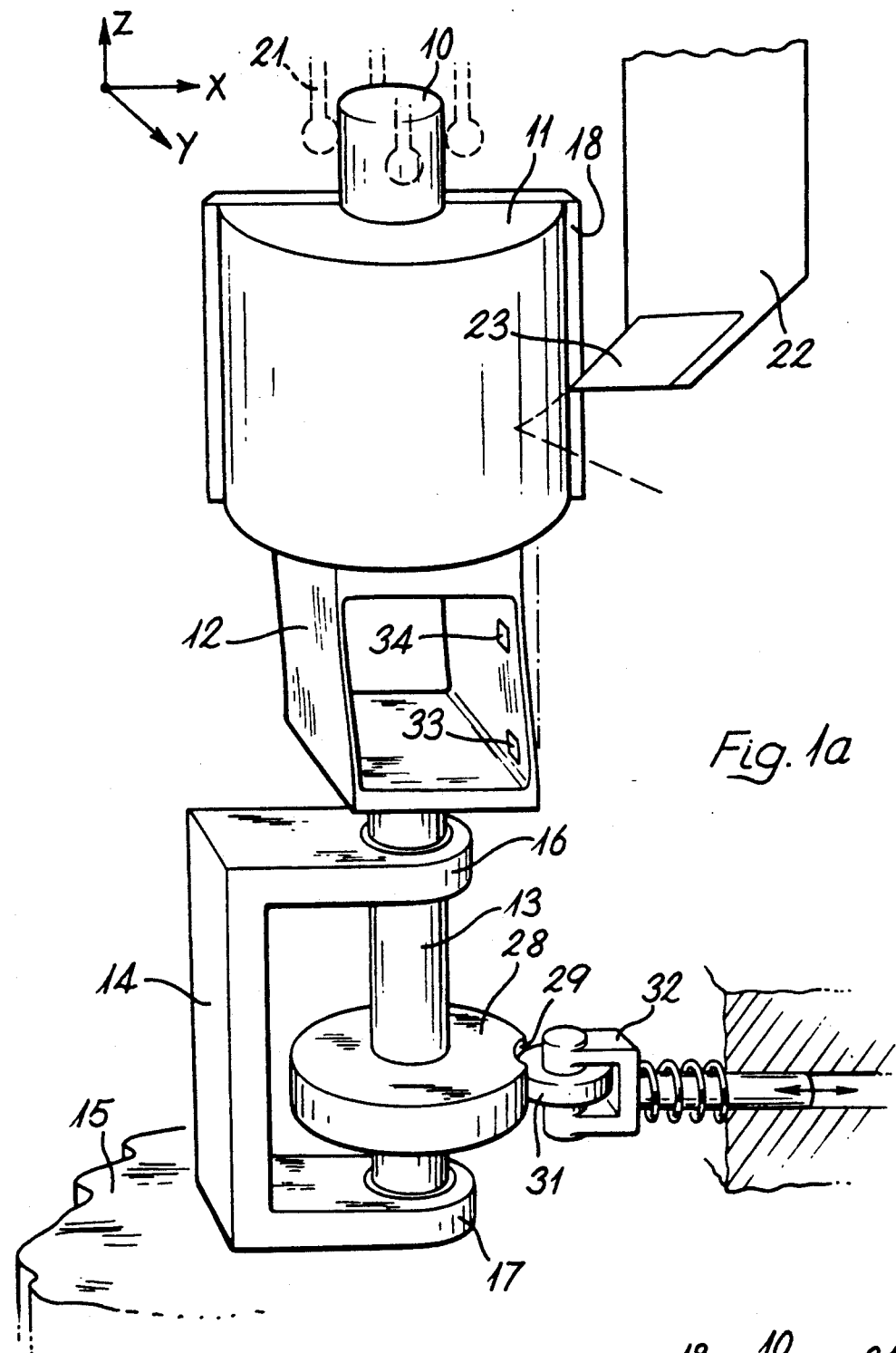
Figure 1C:
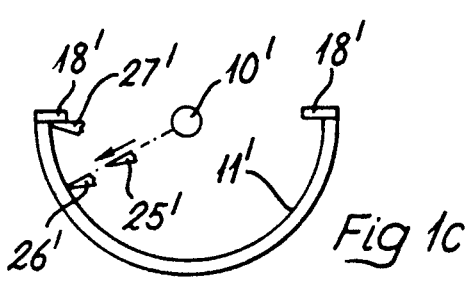

United States Patent [19]

Nickols

[11] Patent Number: 5,035,554
[45] Date of Patent: Jul. 30, 1991

[54] METHOD FOR DETERMINING THE RADIUS DESCRIBED BY A TOOL

[76] Inventor: Francis M. J. Nickols, 22 Gloucester Street, Wotton-Under-Edge, Gloucestershire GL12 7DN, England

[21] Appl. No.: 458,616
[22] PCT Filed: Jul. 25, 1988
[86] PCT No.: PCT/GB88/00610
§ 371 Date: Jan. 19, 1990
§ 102(e) Date: Jan. 19, 1990
[87] PCT Pub. No.: WO89/01193
PCT Pub. Date: Feb. 9, 1989

[30] Foreign Application Priority Data

Jul. 25, 1987 [GB] United Kingdom ........ 8717703
Sep. 22, 1987 [GB] United Kingdom ........ 8722223
Mar. 11, 1988 [GB] United Kingdom ........ 8805845
Mar. 11, 1988 [GB] United Kingdom ........ 8805846

[51] Int. Cl.⁵ .................. B23C 9/00; B23B 35/00
[52] U.S. Cl. .................. 409/131; 408/1 R; 408/13
[58] Field of Search .......... 409/131; 364/474.17, 364/474.34; 33/626, 638, 628, 632, 201; 408/1 R, 13, 147, 150, 151, 152, 180

[56] References Cited

U.S. PATENT DOCUMENTS 3,492,894  2/1970  Hann et al. ............. 408/13
4,016,470  4/1977  Gabor et al. ........... 408/16 X
4,400,118  8/1983  Yamakage .............. 408/12 X
4,417,490 11/1983  Mochizuki ............. 82/118
4,451,892  5/1984  McMurtry .............. 408/13 X
4,513,646  4/1985  McMurtry .............. 82/118 X
4,648,757  3/1987  Plummer ............... 408/12

FOREIGN PATENT DOCUMENTS 43920    1/1982  European Pat. Off. .
1402994 12/1968  Fed. Rep. of Germany ........ 408/13
1652658  4/1971  Fed. Rep. of Germany .
3246994  6/1984  Fed. Rep. of Germany .
3526712  1/1987  Fed. Rep. of Germany .
450653  12/1974  U.S.S.R. .
880635  11/1981  U.S.S.R. .
604315   7/1948  United Kingdom .
1215822 12/1970  United Kingdom .
1251089 10/1971  United Kingdom .
2131332  6/1984  United Kingdom .

Primary Examiner—William Briggs
Attorney, Agent, or Firm—Cushman, Darby & Cushman

[57] ABSTRACT

In CNC machining, the radius of the circle described by a tool tip has been set manually using a separate setting machine. The present invention allows such a radius to be set automatically. A rotary datuming touch trigger probe has internal and external cylindrical datum surfaces 40 and 41. Threee piezo-electric crystals 47a, 47b, and 47c are mounted between a mounting member 43 for the cylindrical surfaces and a collar 44 fixed to a machining table 46. The tip of a tool forming part of a boring head is brought into engagement with the surfaces by driving the tool along the U-axis and when engagement occurs it is sensed by the piezo-electric crystals which send a signal to a computer. The procedure is repeated with the tool tip 180° and 270° around the cylindrical surfaces from its original position allowing the computer to determine the radius of the tool tip relative to the axis of the datum surfaces. Other forms of rotary datuming probes are also described.

17 Claims, 5 Drawing Sheets

METHOD FOR DETERMINING THE RADIUS DESCRIBED BY A TOOL

The present invention relates to methods and apparatus for automatically obtaining an indication of the radius of a circle described by the tool tip, that is the cutting edge of a boring tool, for example, when driven by a machine tool.

The determination of the radius or diameter described by a boring head tool tip is not at present carried out as an unmanned operation and in-process on a CNC boring or milling machine tool.

Instead, tool setting is carried out manually using a tool setting machine separate from the CNC machine tool. Generally fixed radius boring bars with a small range of radius adjustment are used. Usually, a new tool tip is secured in a boring bar and an operator manually rotates the boring head to find the maximum deflection of a displacement sensor by trial and error. This maximum deflection determines the described radius of the tool tip. The operator then adjusts the boring head to set the radius to the correct value.

According to a first aspect of the present invention there is provided a method for use in obtaining an indication of the radius of a circle described by the tip of a tool when driven by a machine tool comprising mounting a tool for rotation parallel to the maximum curvature of an arcuate surface, bringing the tip of the tool into contact with the arcuate surface at least in two successive positions 180° apart with respect to the centre of rotation of the tip while varying the distance between the said centre of rotation and either the tip or the centre of arc of the surface if necessary to allow contact in the two positions to occur if the centre of arc is not coincident with the said centre of rotation, and obtaining an indication of any change in the said distance, to allow the radius described by the tool tip to be derived from the radius of the arcuate surface and the said change in the said distance.

The method is most accurate when the centre of rotation of the tip and the centre of arc are coincident the change in the said distance is then zero and the radius described by the tool is equal to the radius of the arcuate surface However the method is intended for use when the two centres are nominally coincident but it becomes inaccurate when the centres are too far apart.

An advantage of the invention is that it allows the radius of a boring tool to be set unmanned and on the machine tool or at any other location as required The invention differs from previous usage in that the diameter described by the tool tip itself is determined.

According to a second aspect of the invention there is provided apparatus for use in the method of the first aspect, comprising an arcuate surface mounted for rotation with an axle, spring means mounted between the arcuate surface and the axle, engagement means for causing the arcuate surface to rotate when engaged by the tip of a rotating tool, and measuring means for providing a signal representative of deflection by the spring means.

In operation the tool tip is brought into contact with the arcuate surface and is rotated until the engagement means is engaged. The tool tip is then rotated through at least a further 180° and causes the arcuate surface to rotate with it. The radius of the circle described by the tool tip is then derived from the radius of the arcuate surface and the output of the measuring means, at least, at two points 180° apart, as the tool tip and the surface rotate together.

The spring means may comprise a planar spring, and the measuring means may then include strain gauges mounted on the planar spring to provide deflection signals over an infinite number of contact positions as the tool tip and the arcuate surface rotate together. The engagement means may comprise a projection on the arcuate surface which allows the tool tip when rotated, to engage the projection and rotate the arcuate surface as the tool is rotated.

Since the arcuate surface can be concave or convex, the radius of a tool set for internal or external boring can be determined.

According to a third aspect of the invention there is provided apparatus for use in the method of the first aspect comprising an arcuate surface for mounting on a machine table, and means coupled to the arcuate surface, for sensing the contact of a tool tip with the surface, and for providing a trigger signal when such contact is sensed.

In the most simple form of operation, the tool tip is brought into contact with the arcuate surface at least, at two points 180° apart. When the resulting trigger signal occurs the relative distances of the tool tip from the centre of rotation of the tool tip are determined, and the radius (or diameter) of the circle described by the tool tip is calculated.

The means for providing a trigger signal may comprise three piezo-electric crystals spaced at 120° around the arcuate surface and so mounted that pressure applied to the surface causes a pressure change to one or more of the crystals depending on where the pressure is applied.

The arcuate surface may be mounted on the machine table by way of overtravel means, allowing the surface to move before it is damaged by the tool tip. The overtravel means may then include the means for providing the trigger signal.

The tool tip may be brought into contact with the arcuate surface at many different angular positions but preferably at four positions, two in line with the X-axis of the machining table and two in line with the Y-axis of the table.

The arcuate surface need not be continuous and in particular it may only be present where the tool tip is to come in contact with it. Where the arcuate surface is fixed to the machining table a number of arcuate surfaces may be used allowing both internal and external bores to be set and allowing a number of different radii to be set accurately.

Figure 1B:
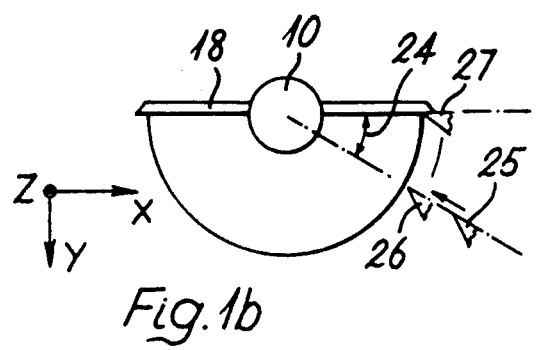
Figure 2:
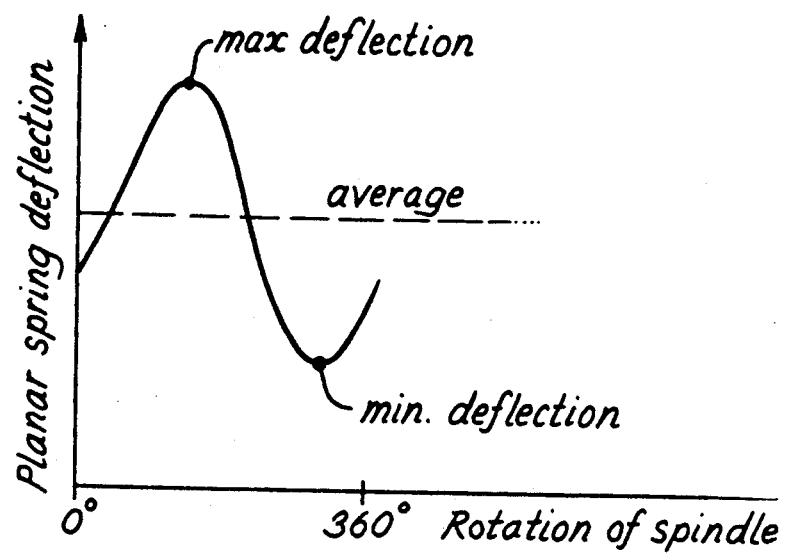
Figure 3:
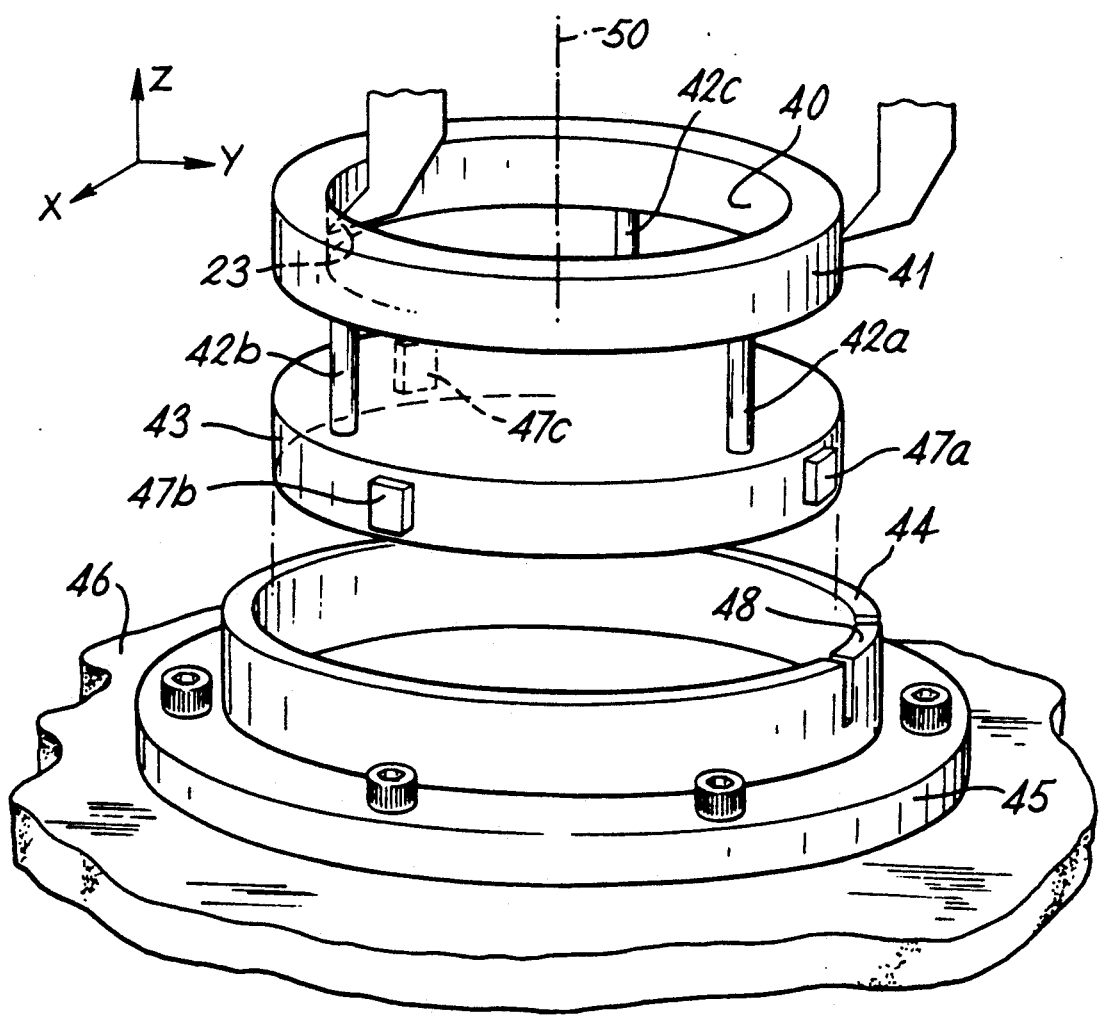
Figure 4:
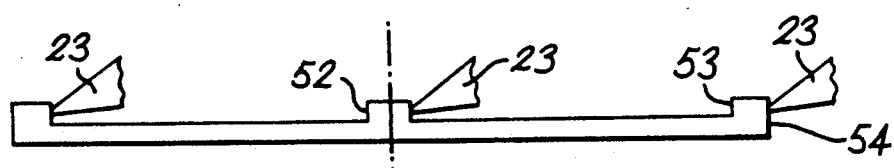
Figure 5:
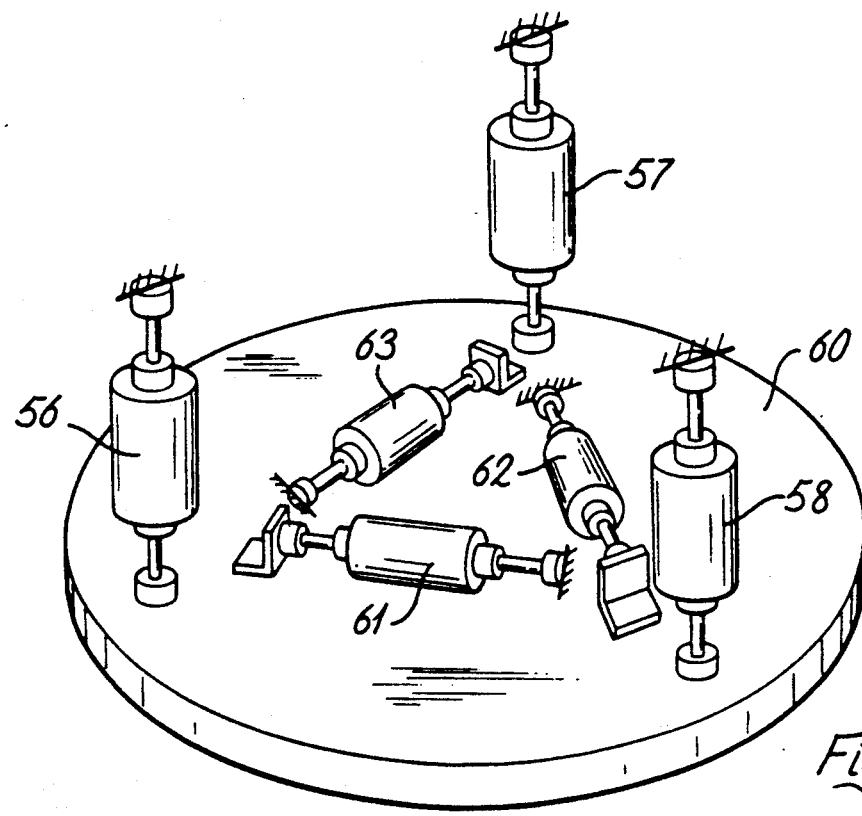
Figure 6:
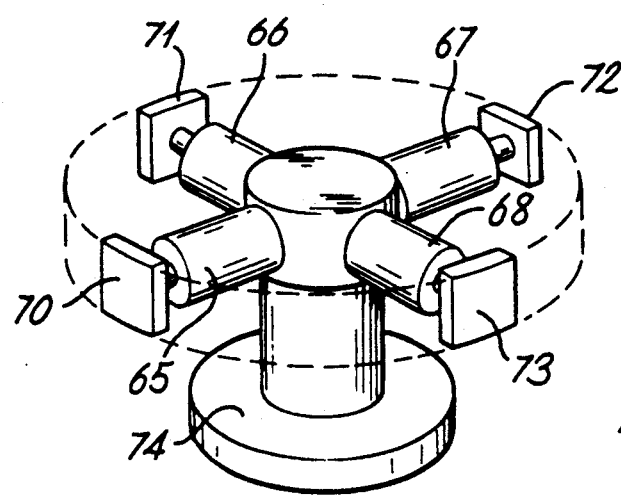
Figures 7, 8:
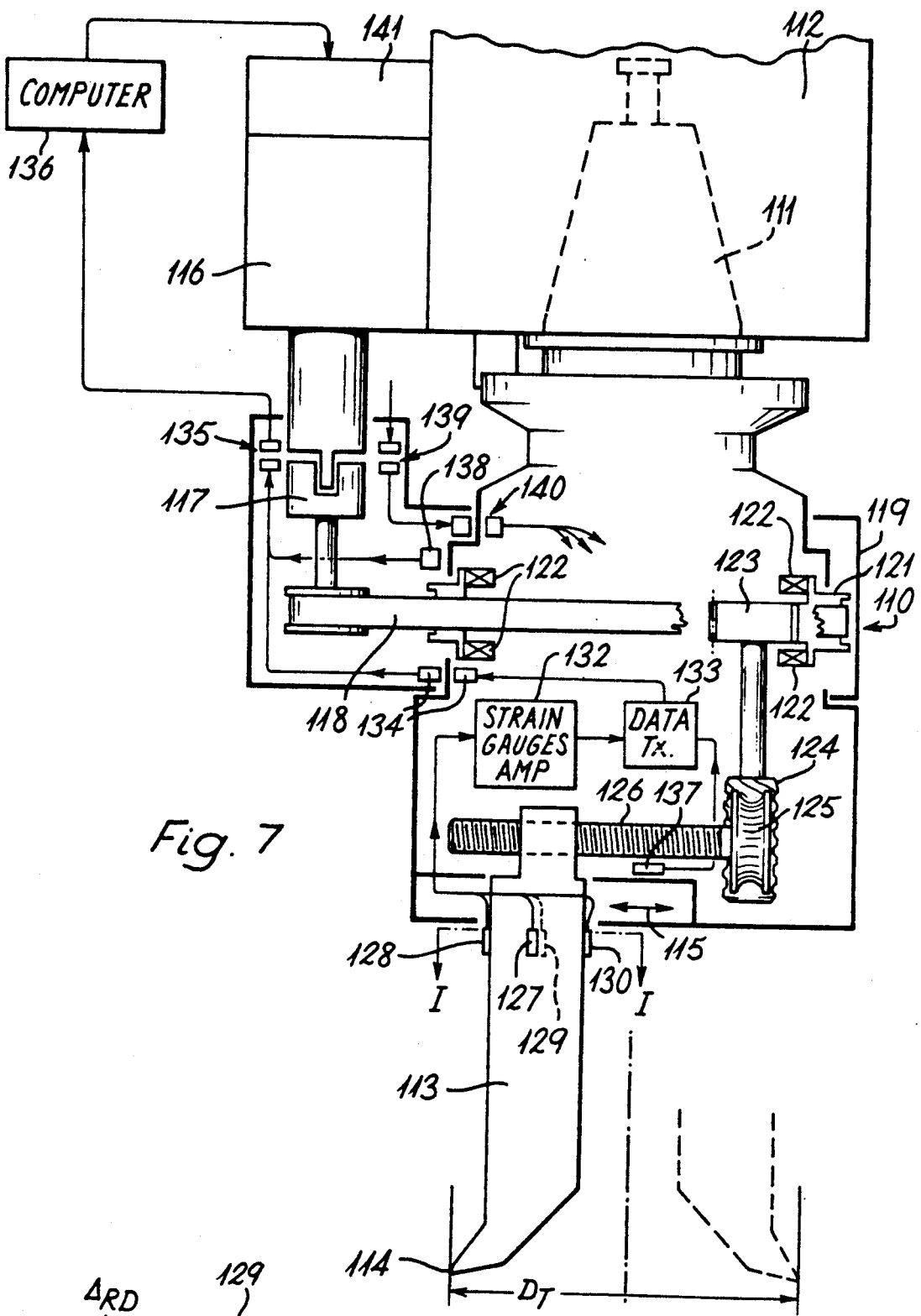
Figure 9:
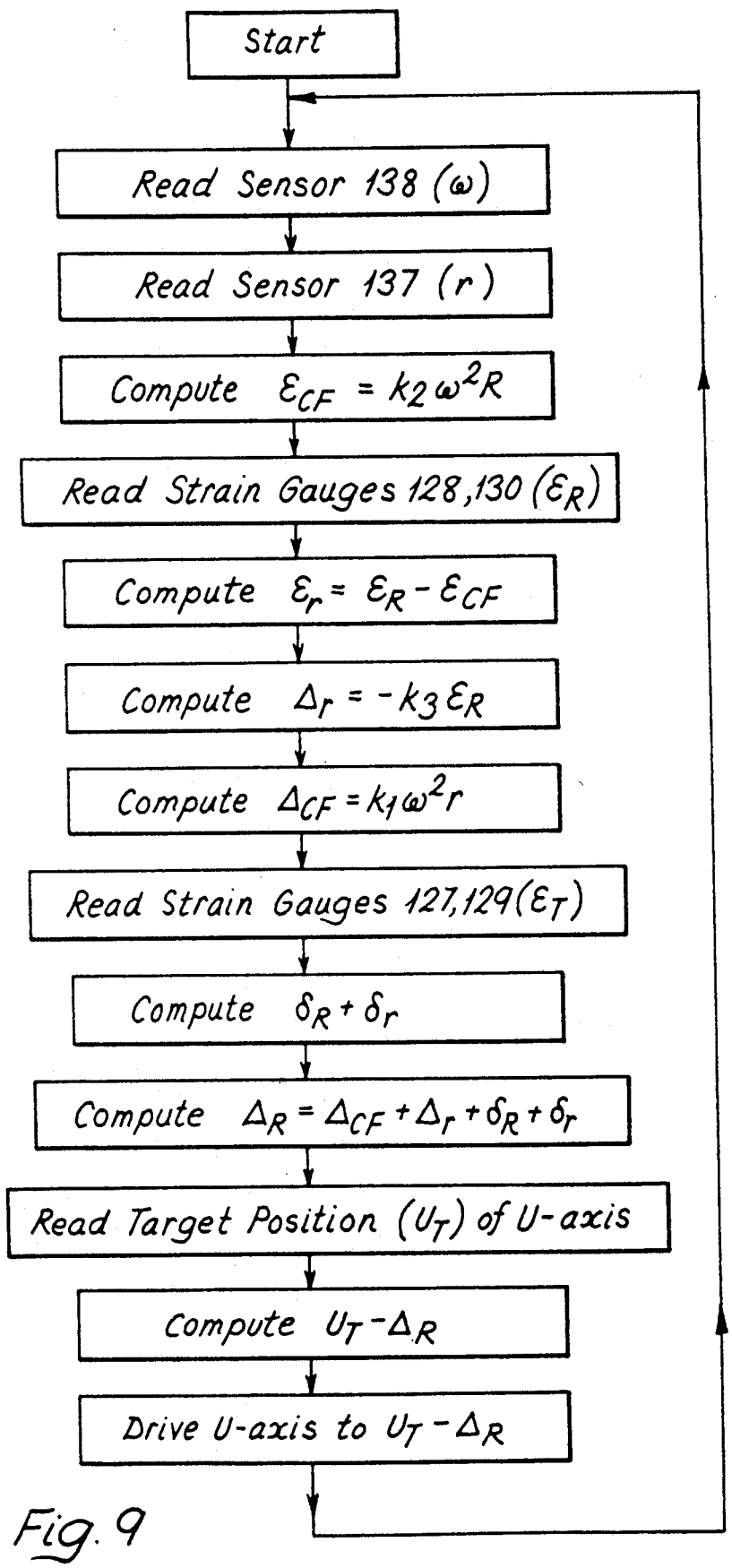

Certain embodiments of the invention will now be described, by way of example, with reference to the accompanying drawings in which:

FIG. 1a is a schematic perspective view of an embodiment of the second aspect of the invention using a planar spring, FIGS. 1b and 1c are plan views of part of the embodiment of FIG. 1a and of another embodiment showing how they are used in practice, FIG. 2 is a graph showing deflection of the planar spring versus rotation of a spindle carrying the spring, FIG. 3 shows an exploded view of an embodiment of the third aspect of the invention using fixed arcuate surfaces, FIG. 4 shows an embodiment employing three arcuate surfaces enabling internal and external datuming, FIG. 5 shows a mounting for the arrangement of FIG. 3 which allows "overtravel" when a tool tip is brought into contact with the arcuate surface, FIG. 6 shows an embodiment employing four parts of an arcuate surface and four overtravel units, FIG. 7 is a schematic cross-section showing a boring head which may be used with the invention, FIG. 8 is a cross-section in the directionn I—I of the boring bar of FIG. 7, and FIG. 9 is a flow chart of an algorithm for deriving a signal to correct the position of the tool tip of the boring head while machining is in progress.

In FIG. 1a a rotary datum probe (RDP) includes a circular spigot 10, a hardened steel half cylinder 11, a planar spring 12 and an axle 13, all mounted by way of a fixed member 14 on a machine table 15. The axes of the spigot 10, the half cylinder 11 and the axle 13 are all coaxial and, for example, the components 10, 11 and 13 may all be manufactured by turning in a lathe with half of the complete cylinder cut by the lathe later milled away to provide the half cylinder 11, and with the planar spring milled into the section between the half cylinder 11 and the axle 13. The half cylinder is mounted for rotation on the axle 13 by way of two precision angular contact bearings 16 and 17 which are axially preloaded to eliminate radial and axial play.

A flat plate 18 is attached to the half cylinder 11 over a plane coincident with the axis of the half cylinder. The plate 18 projects a little beyond the diameter of the half cylinder.

In operation, a machine tool locates the position of the spigot 10 using a touch trigger probe 21 indicated in various positions by means of chain dotted lines. The touch trigger probe is then exchanged for a boring head set so that its axis of rotation is nominally coincident with the axle 13. The boring head carries a boring tool 22 with a cutting tool tip 23. The radial position of the tool 22 is controlled by a drive which moves the tool along a U-axis to vary the radius described by the tool tip.

The boring head is now used to drive the tool tip to a radius greater than that of the half cylinder 11 and the boring bar is rotated to position the U-axis at an angle 24 (see FIG. 1b) which is typically 5° to the X-axis. The boring head is now lowered over the half cylinder 11 so that the tool tip takes up a position alongside the half cylinder as shown at 25 in FIG. 1b and the U-axis is now driven with no change in X, Y or Z coordinates to bring the tool tip into contact with the half cylinder as shown towards the half cylinder so deflecting the planar spring.

The U-axis is now rotated to move the tool tip into contact with the plate 18 (see position 27 in FIG. 1b). Up to this point the half cylinder 11 is held stationary by a detent system consisting of a disc 28 mounted on the axle 13 and having an inset 29 which engages with a rotary bearing 31 mounted on spring-loaded plunger 32. When the tool tip 23 engages the plate 18 the detent torque is overcome and continued rotation of the U-axis causes the tool tip to rotate the half cylinder 11.

Rotation of the U-axis is continued through a further 360° and the half cylinder also rotates. In general the axes of the boring bar and the axle 13 are not exactly aligned and deflection of the planar spring 12 varies during rotation as shown in FIG. 2. The initial deflection of this spring is chosen to be within the measurement range of the planar spring and to ensure that contact between the tool tip and the half cylinder is maintained when the U-axis is rotated through 360°. Deflection is measured by two strain gauges which are mounted inside the planar spring 12. For small radial displacements of the half cylinder 11 movement is essentially orthogonal to the axis of the axle 13 with very little axial displacement of the half cylinder 11.

The position of the tool on the boring bar is held in a register of a computer associated with the machine tool. The contents of this register (U) are now set according to:

$$U = \frac{D}{2} - \Delta$$

where D is the diameter of the half cylinder 11, and $\Delta$ is the mean deflection of the planar spring 12.

The mean deflection is calculated by the computer from the outputs of the strain gauges 33 and 34 as the tool tip is rotated in engagement with the plate 18 through 360°. In a simplified but less accurate method, the mean of the minimum and maximum deflections only are taken.

Having set the U-register in this way, any required change in the radius of the circle described by the tool tip may assuming that movement along the U-axis is accurately measured, be set by driving the tool along the U-axis and updating the contents of the U-register from a counter whose contents represent movement along the U-axis.

For example with an increase in radius of R the U-axis register is updated according to:

$$U = U + R.$$

Similarly if any decrease in radius R is required then the U-axis is driven by the amount R and the U-axis register is updated as:

$$U = U - R.$$

The radius of a tool set for internal boring can be set using an RDP similar to that of FIG. 1a except that a concave arcuate surface replaces the convex surface. FIG. 1c is a plan view with the concave surface shown at 11'. When the tool tip 23 is brought into engagement with the cylinder it passes through positions 25', 26' and 27' analogous to positions 25, 26 and 27. In position 27' it engages one of two plates 18' having the same function as the plate 18. A spigot 10' extends from the top of the spring 12 and is of smaller diameter than the spigot 10 to allow room to manoeuvre the tool inside the cylinder. If more room is needed, the cylindrical surface may extend through 360° to allow the external surface to be used for locating the RDP. The spigot 10' is then not required.

Another embodiment of the invention, known as a rotary datuming touch trigger probe (RDTP), is shown in the exploded view of FIG. 3, and comprises internal and external cylindrical datum surfaces 40 and 41, respectively. Three pillars 42a, 42b and 42c are used to mount the datum surfaces to a touch-trigger mounting member 43 which is located inside a collar 44 fixed to a base plate 45. The three pillars prevent build-up of swarf and coolant inside the datum surface 40. The base plate 45 is bolted to a machine table 46 and the whole arrangement of FIG. 3 is such that the datum surfaces 40 and 41 are parallel to the Z-axis of the table 46. Three piezo-electric crystals 47a, 47b and 47c are mounted on the member 43 to fit tightly between this member and the collar 44. A radially compliant tab 48 allows tight contact between the piezo-electric crystals, the member 43 and the collar 44. The piezo-electric crystals are located at 120° around the cylindrical periphery of the member 43 and they are radially polarised to provide outputs when pressure is applied to either of the datum surfaces 40 and 41.

Each piezo-electric crystal is connected to an amplifier which is coupled to a respective threshold circuit. The outputs of these threshold circuits are connected to an OR circuit to provide an engagement signal when any threshold is exceeded.

The RDP and the RDTP are preferably used with the boring head described in the copending U.S. application filed on the same date as the present application No. 07/458617 (Inventor: F. M. J. Nickols). The boring head of the copending application which is described below includes means for measuring the deflection of the tip of a tool forming part of the head and the head has an associated computer to derive the position of the tool tip when machining is being carried out.

In operation with the boring head of the copending application, a touch trigger probe is placed in a machine tool spindle and used to find the centre of the cylindrical datum surfaces, that is the X and Y coordinates (in the machine table) of an axis 50 of these surfaces. The boring head is placed in the spindle with the spindle axis coincident with the axis 50 and at such a distance from the surfaces 40 and 41 that the tool tip is clear of these surfaces. The tool tip is now moved radially by a U-axis drive of the boring head until it is clear of the datum surface which is to be used. For example if internal boring is to be carried out the U-axis is driven to position the tool tip at a diameter of about 1 mm less than the diameter of the datum surface 40 and vice versa for external boring when the tool tip is at a diameter of about 1 mm greater than the external cylindrical surface 41. Next the Z-axis is driven to place the tool tip alongside the relevant datum surface and the spindle is rotated to align a line joining the tool tip and the axis 50 with the X-axis.

In this position the tool tip radius is increased for internal boring and decreased for external boring until the tool tip engages one of the datum surfaces The engagement is sensed by the piezo-electric crystals which send a signal to the boring head computer stopping the U-axis movement and transferring the reading of a U-axis displacement sensor in the boring head to a first engagement counter in the computer Next the radius of the tool tip is changed by about 0.5 mm to clear the tool tip from the datum surface and the machine tool spindle is rotated through 90° and the procedure for bringing the tool tip into contact with one of the datum surfaces repeated except that the reading of the U-axis displacement sensor is transferred to a second engagement counter in the computer. The procedure is repeated with the spindle at 180° and 270° to the original position and on contact with the datum surface the U-axis displacement sensor readings are transferred to third and fourth engagement counters.

Immediately after each transfer of a U-axis sensor reading to one of the engagement counters, the result of a calculation carried out by the computer and indicating the deflection of the tool tip may be subtracted from the contents of that counter to take account of the radial tool tip deflection brought about by the engagement force between the tool tip and the datum surface. However this force is usually small since position sensing is being carried out not cutting and therefore the deflection is usually insignificant.

When the four engagement Counters contain readings corrected if necessary, the average of the contents of the counters $U_{AVE}$ is calculated by the computer:

$$U_{AVE} = \frac{U_1 + U_2 + U_3 + U_4}{4}$$

where $U_1$, $U_2$, $U_3$ and $U_4$ are the contents of each of the engagement counters.

Any difference in position in the X-Y plane between the centre of rotation of the tool tip and the axis 50 of the datum surfaces is taken into account by deriving $U_{AVE}$.

$U_{AVE}$ represents the radius of a circle described by an unknown point on, or associated with, the tool, since the U-axis displacement sensor does not provide the absolute position of a known point such as the tool tip. In order to determine the radius of the circle described by the tool tip, a constant offset $U_{OFF}$ is added to the output of the displacement sensor. This offset is given by $$U_{AVE} + U_{OFF} = R_{DS}$$

where $R_{DS}$ is the radius of the relevant cylindrical datum surface.

Giving:

$$U_{OFF} = R_{DS} - U_{AVE}.$$

Thus the diameter bored by the tool tip when subjected to cutting and centrifugal forces is as follows $$D_T = 2(U + U_{OFF}) + \Delta D$$

where U is the U-axis displacement sensor reading and $\Delta D$ is the increase of tool tip swept diameter brought about by cutting and centrifugal forces and calculated by the boring head computer.

An error which is likely to occur is due to the lateral misalignment of the tool tip and a line passing through the centre of rotation of the boring head and parallel to the U-axis. This error is zero at the datumed radius $R_{DS}$ and progressively increases with swept radii above and below that of $R_{DS}$. It can be reduced to an acceptable amount by shimming the tool in order to minimise the lateral misalignment. Alternatively, a group of concentric cylindrical datum surfaces such as the surfaces 52, 53 and 54 in FIG. 4 can be used instead of the surfaces 40 and 41. Such an arrangement not only compensates for the lateral misalignment of the tool tip but also has the added advantage of calibrating the U-axis over most of its displacement range. The surfaces of FIG. 4 allow the U-axis to be datumed at upper and lower displacement positions for external boring and at an upper position for internal boring. U-axis sensor readings at the upper and lower limits allow a calculation to be carried out to determine the lateral misalignment value and the computer can then take this value into account when calculating the swept radius. In a more simple alternative method the upper and lower datumed diameters are used to calibrate the U-axis displacement sensor according to a first order linear equation so reducing the real time computing effort considerably.

The cylindrical datum surfaces are manufactured from a hard material and surface hardened so as to resist any plastic deformation from the tool tip. However, in the event of any misuse of the RDTP or a malfunction of the touch trigger sensing arrangement, as described so far, the datum surfaces could be damaged. Also, the whole RDTP system or the boring head could be damaged if the boring bar is incorrectly positioned as the tool tip is driven in the Z-direction to be alongside a datum surface. Preferably therefore the RDTP has an overtravel repositioning system which produces an electrical output signal when overtravel occurs. The overtravel repositioning system allows movement along the axis of the cylindrical datum surfaces and in a plane orthogonal to this axis but only when a threshold force, set such that neither the datum surfaces nor the RDTP nor the boring head is damaged, is overcome.

In one overtravel repositioning system the cylindrical datum surfaces are mounted on a member coaxial with the axis 50. Three rods project at 120° in a plane orthogonal to this member from the end which is remote from the cylindrical surfaces. Each rod is supported on a base plate by a pair of balls. The balls and the rods are electrically conducting but the base plate is not and a circuit is set up in which each pair of balls and the supporting rod form a switch which is broken when overtravel in a certain direction occurs. The switches are connected in series and when overtravel occurs an electrical signal is obtained which is supplied to the computer.

Another overtravel repositioning system is shown in FIG. 6 where three overtravel repositioning units 56, 57 and 58 support the datum cylinders on a base plate 60. The axes of these units are parallel to the axis of the datum cylinders. The lines which are shaded on one side denote a common connection to the cylindrical datum surfaces and the overtravel repositioning units are such that axial movement is resiliently opposed while movement normal to the axes of the units 56, 57 and 58 is unrestricted. Three more overtravel repositioning units 61, 62 and 63 oppose movement normal to the axis of the cylindrical surfaces but allow movement in other directions. Again lines shaded on one side represent a common connection to the cylindrical datum surfaces. Each repositioning unit is constructed to act as a switch which operates when a certain amount of axial compression occurs. These switches are connected in series and give an electrical indication of overtravel.

Provided the overtravel repositioning systems are highly reproducible the electrical signals they produce may replace signals from the piezo-electric crystals 47a, 47b and 47c. Thus the cylindrical datuming surfaces can be directly mounted on the overtravel repositioning system without the use of the piezo-electric crystals and the U-axis sensor is read when an overtravel signal is given.

Other forms of overtravel repositioning system may be devised and used to replace those specifically mentioned above.

Each cylindrical datuming surface need not necessarily be a complete cylinder and may for example consist of three or four engagement surfaces normally at 120° or 90° separation, respectively, where each surface is part of the same cylindrical surface. Such an arrangement is shown in FIG. 6 where four highly reproducible single axis touch trigger and overtravel units 65 to 68 are employed. Each unit supports a corresponding part 70 to 73, respectively, of a cylindrical datum surface indicated by the dotted lines. As before the overtravel units form switches which are connected in series so that when overtravel on any one surface part 10 to 73 occurs, a signal is given causing the U-axis displacement sensor to be read. The units 65 to 68 are mounted to a base plate 74 bolted to the machine table.

Usually the tool and the cylindrical surfaces are made of electrically conducting material. If so, a continuity tester can be connected to the cylindrical surfaces and the tool, the latter by way of a machine tool spindle holding the tool, for example. Signals indicating continuity can then be used to indicate when the tool touches the cylindrical surfaces. Thus for this alternative the piezo-electric crystals are not required.

The invention can be put into practice in many other ways than those specifically described above. For example where a group of cylindrical datum surfaces is provided it is not necessary that they are concentric since the machine tool spindle can centre on each surface separately and $U_{AVE}$ can be calculated for each surface. However concentric surfaces are preferable since the datuming procedure required is less cumbersome and minimises programming and machining costs.

Where parts of cylindrical datuming surfaces only are provided, a minimum of two parts positioned nominally at 180° is adequate for datuming a boring head (that is determining the radius of the circle described by the tool tip of the head) so long as it is possible to determine the centre of curvature of the surfaces.

If an RDTP is to be used with a horizontal boring machine then the base plate is mounted in the vertical plane and the weight of the cylindrical datum surfaces and any other movable mass which relies on an overtravel repositioning system for support is counterbalanced for correct operation. Since the datum surfaces are fixed they can be counterbalanced by means of a spring between a member which has the datum surfaces and a fixed support.

The above mentioned boring head of the copending application is now described.

The boring head 110 shown in FIG. 7 is a tool changeable device which can be mounted on a machine tool spindle for use with CNC boring, milling and flexible manufacturing machine tools. In operation, a shank 111 is mounted on a machine tool spindle 112 so that a boring bar 113 with a tool tip 114 is rotated to machine a diameter $D_T$ shown, in this example, as an internal diameter. The U-axis 115 is driven by an external motor 116 mounted on the machine tool spindle 112. The motor 116 drives through a clutch 117 to a belt drive 118 contained in a static collar 119. Within the static collar the belt drive 118 drives a wheel 121 (shown in section) having bearings 122. A gear wheel 123 meshes internally with the wheel 121 driving a worm 124 and a worm wheel 125 fixed to a lead screw 126. The root of the boring bar 113 is mounted to move along as the lead screw 126 rotates. Thus the U-axis 115 can be adjusted from the drive motor 116.

Four strain gauges 127 to 130 are axially mounted on the boring bar adjacent to the end coupled to the lead screw. Connections from the strain gauges are taken to a strain gauge amplifier 132 and then by way of a data transmitter 133 and non-contact interfaces 134 and 135 to a computer 136 associated with the boring head which may be the computer mentioned above. A U-axis displacement sensor 137 provides a signal representative of change in position of the boring bar and this signal is passed by way of the data transmitter 133 and the interfaces 134 and 135 to the computer 136. A signal representative of the rotational speed of the boring head is provided by a rotary sensor 138 coupled by way of the interface 135 to the computer 136. Electrical power for the strain gauge amplifier and the data transmitter is provided by two contacting or non-contacting interfaces 139 and 140 indicated schematically.

As is explained in more detail below, the computer 136 determines change in swept diameter of the tool tip due to the radial deflection $\Delta_{RD}$ and the tangential deflection $\Delta_{TG}$ (see FIG. 8) of the tool tip 114 from the signals from the strain gauges 127 to 130. These deflections are caused by the tool tip radial and tangential cutting forces $F_R$ and $F_T$, respectively, together with centrifugal force loading the boring bar. The boring bar deflects under centrifugal loads which are approximately uniformly distributed along the length of the boring bar, and the cutting forces which are concentrated loads at the end of the cantilevered boring bar cause further deflection. The computer 136 calculates the centrifugal loading from the boring bar mass and geometry, the U-axis displacement as sensed by the sensor 137 and the rotational speed of the boring head as sensed by the sensor 138.

A signal representative of target bore diameter is applied to the computer and the computer determines the change in swept diameter of the tool tip 111 during boring operations from the data sent to it. An output signal is sent by the computer to a motor drive control 141 whereby the U-axis is adjusted to make the swept diameter $D_T$ equal to the target diameter.

The position of the tool tip is datumed in relation to the U-axis before machining is started. This operation is carried out unmanned on the machine tool and in process by using either the rotary datuming probe (RDP) or the rotary datuming touch trigger probe (RDTP) described above. As mentioned above the RDP or the RDTP allows the computer 136 to determine an offset $U_{OFF}$ for the U-axis so that the swept diameter $D_T$ is calculated by the computer from the following equation:

$$D_T = 2(U + U_{OFF}) + \Delta D$$

where $\Delta D$ is the increase of tool tip swept diameter brought about by cutting and centrifugal forces, and U is the output of the U-axis sensor.

The U-axis is initially set with $D_T = 2(U + U_{OFF})$ to give the required value of $D_T$ and then as soon as machining starts $\Delta D$ is taken into account and corrections are automatically made.

An error which is likely to occur is caused by the tool tip being misaligned with respect to a line passing through the centre of rotation of the boring head and parallel to the U-axis. This lateral misalignment, $\Delta_m$ produces a swept diameter error which is zero at the datumed radius but progressively increases in magnitude above and below this diameter. The computer 136 may carry out a calculation to determine the misalignment $\Delta_m$ from multiple values of $U_{OFF}$ calibrated at different radii. The misalignment value is then used by the computer in calculating $D_T$.

The tool tip cutting forces produce deflections in the machine tool and workpiece itself and the computer 136 can take account of these deflections which would otherwise produce errors in bore diameter and circularity. Usually, however, where very accurate bores are required a last fine cut is taken where the deflection of the machine tool and workpiece are negligible.

An explanation of the way in which the change in swept diameter or radius under the influence of various forces is calculated by the computer is now given.

Change in swept radius of the boring bar is due to the following forces:
a) centrifugal force (a distributed load acting along the bar),
b) a radial component of the cutting force, $F_R$
c) a tangential component of the cutting force, $F_T$, and
d) torsional force which is likely to have an insignificant effect.

The signals from the strain gauges 127 to 130 and the sensor 138 allow the change in swept radius to be calculated.

The increase in swept radius due to centrifugal force is given by $$\Delta_{CF} = k_1 \omega^2 r$$

where $k_1$ is a constant found empirically but approximately equal to $$\frac{L^3 m}{8EI},$$

and where
L is the length of the boring bar,
m is the mass of the boring bar,
E is Young's Modulus for the material of the boring bar, and
I is the second moment of area of the cross-section of the boring bar.

The swept radius change due to the radial component of the cutting force is calculated from the radial strain $\epsilon_R$ obtained from the output of the strain gauges 128 and 130. However the strain due to centrifugal force $\epsilon_{CF}$ must first be subtracted from $\epsilon_R$ to give the strain $\epsilon_r$ due to the radial cutting force component, that is $$\epsilon_r = \epsilon_R - \epsilon_{CF}.$$

The strain $\epsilon_{CF}$ due to centrifugal force is given by $$\epsilon_{CF} = k_2 \omega^2 r$$

where $k_2$ is a constant found empirically but approximately equal to $$\frac{yLm}{2EI},$$

$\omega$ is the angular velocity of the boring bar,
r is the distance of the centre of gravity of the boring bar from the axis of rotation, and
y is the radius of the boring bar (which is assumed to be cylindrical).

Finding $\epsilon_{CF}$ allows $\epsilon_r$ to be found and then swept radius $\Delta_r$ change due to the radial cutting force component is given by $$\Delta_r = -k_3 \epsilon_r$$

where $k_3$ is a constant found empirically but approximately equal to $$\frac{L^2}{3y}.$$

Note that the radial cutting force reduces the swept radius.

It can be shown that the change $\delta_R$ in swept radius due to the tangential component is given by $$\delta_R = \frac{k_4^2}{2r} \epsilon_T^2$$

where $\epsilon_T$ is tangential strain obtained from the strain gauges 127 and 129, and $k_4$ is a constant found empirically but approximately equal to $$\frac{L^2}{3y}$$

Any change in swept radius $\delta_r$ due to torsion in the boring bar is a function of $\epsilon_T$ and r, where $f(r,\epsilon_T)$ can be determined theoretically and confirmed by experiment.

Thus the total change $\Delta_R$ in swept radius is given by $$\Delta_R = \Delta_{CF} + \Delta_r + \delta_R + \delta_r$$

An algorithm for the computer 136 to determine $\Delta_R$ is given in FIG. 9. Although $\delta_r$ is shown in FIG. 9 it is usually not necessary to take change in swept radius due to torsion into account.

I claim:

1. A method for use in obtaining an indication of the radius of a circle described by the tip of a tool when driven by a machine tool comprising
    mounting a tool for rotation about an axis nominally coincident with the axis of the maximum curvature of an arcuate surface,
    bringing the tip of the tool into contact with the arcuate surface at least in two successive positions 180° apart with respect to the centre of rotation of the tip while varying the distance between the said centre of rotation and either the tip or the centre of arc of the surface if necessary to allow contact in the two positions to occur if the centre of arc is not coincident with the said centre of rotation, and
    obtaining an indication of any change in the said distance, to allow the radius described by the tool tip to be derived from the radius of the arcuate surface and the said change in the said distance.

2. A method according to claim 1 wherein the tip is arranged to be in contact with the surface over a succession of angularly spaced positions by moving the tip into contact with the surface and rotating the tip and the surface together through the said positions, and the indication of any change in the said distance comprises an indication of the deflection of means supporting the surface as it is rotated.

3. A method according to claim 1 wherein the surface is rigidly fixed to a machine table and the tip is brought into contact with the surface at four angularly spaced positions, by rotating a mounting carrying the tip and moving the tip towards the surface at each position, the positions being at 90° around the centre of rotation of the tip with two positions on each of the X and Y axes of the machine table.

4. Apparatus for use in the method of claim 1, comprising
    an arcuate surface mounted for rotation with an axle,
    spring means mounted between the arcuate surface and the axle,
    engagement means for causing the arcuate surface to rotate when engaged by the tip of a rotating tool, and
    measuring means for providing a signal representative of deflection by the spring means.

5. Apparatus according to claim 4 wherein the spring means comprises a planar spring mounted between the arcuate surface and the said axle, and the measuring means includes strain gauges mounted on the planar spring to provide deflection signals when the tool tip and the arcuate surface are rotated together.

6. Apparatus according to claim 5 including means for preventing rotation of the arcuate surface unless a predetermined torque is applied to rotate the surface, and means for engaging the tool tip when it is at a predetermined position on the surface, the engagement being such that when the tool is rotated from the predetermined position in one direction the torque is overcome and the surface also rotates.

7. Apparatus for use in the method of claim 1 comprising
    an arcuate surface for mounting on a machine table, and
    means, coupled to the arcuate surface, for sensing the contact of a tool tip with the surface, and for providing a trigger signal when such contact is sensed.

8. Apparatus according to claim 7 wherein the means for providing a trigger signal comprises three piezoelectric crystals spaced at 120° around the arcuate surface and so mounted that pressure applied to the surface causes a pressure change to one or more of the crystals depending on where the pressure is applied.

9. Apparatus according to claim 8 including a base member for fixing to a machine table, and a mounting member fixed to a datum member, the datum member having one surface which is the said arcuate surface and at least one other coaxial arcuate surface, and the piezoelectric crystals being firmly sandwiched between arcuate surfaces of the base member and the mounting member.

10. Apparatus according to claim 7 wherein the tool tip and the arcuate surface are electrically conducting and the means for providing a trigger signal comprises means for indicating electrical continuity between the tool tip and the arcuate surface.

11. Apparatus according to claim 7 including overtravel means supporting the arcuate surface on a (or the) base member suitable for fixing to a machine table.

12. Apparatus according to claim 11 wherein the overtravel means comprises six overtravel units which are each resilient in the direction of a longitudinal axis thereof, three of the said units having therein axes parallel to the axis of the arcuate surface and supporting the said surface on the base member while allowing movement across a plane surface of the base member normal to the axes of the said three units, the other three units having their axes parallel to the plane of the base member with each coupled at one end to the arcuate surface and opposing movement thereof in three directions mutually at 120° while allowing movement normal to the plane.

13. Apparatus according to claim 7 wherein the or each arcuate surface is formed by a number of separate arcuate part surfaces having the same centre of arc.

14. Apparatus according to claim 7 including overtravel means supporting the arcuate surface on a (or the) base member suitable for fixing to a machine table, wherein the, or each, arcuate surface is formed by four separate arcuate part surfaces having the same centre of arc and the overtravel means comprises four overtravel units which are each resilient in the direction of a longitudinal axis thereof, and each unit supports one of the arcuate part surfaces particular thereto and is positioned radially between that part surface and the centre of arc of the surface.

15. Apparatus according to claim 11 wherein the overtravel means comprises electrical switching means for use in providing a signal when overtravel beyond a predetermined limit occurs.

16. Apparatus according to claim 15 wherein the means for providing a trigger signal comprises the switching means of the overtravel means.

17. Apparatus according to claim 16 wherein the overtravel means comprises a number of overtravel units which are resilient in the direction of a longitudinal axis thereof and each overtravel unit includes a switch which operates when movement in the axial direction of the unit exceeds a limit, and the switching means comprises a circuit containing the switches so connected that if the limit is exceeded in any unit the continuity of the circuit is changed.

* * * * *